US012683149B2

(12) United States Patent
Matsuoka et al.

(10) Patent No.: US 12,683,149 B2
(45) Date of Patent: Jul. 14, 2026

(54) POSITIVE ELECTRODE ACTIVE MATERIAL FOR NON-AQUEOUS ELECTROLYTE SECONDARY BATTERY, AND NON-AQUEOUS ELECTROLYTE SECONDARY BATTERY

(71) Applicant: Panasonic Intellectual Property Management Co., Ltd., Osaka (JP)

(72) Inventors: Rie Matsuoka, Osaka (JP); Takeshi Ogasawara, Osaka (JP); Katsuya Inoue, Hyogo (JP); Yoshinori Aoki, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 1010 days.

(21) Appl. No.: 17/775,076

(22) PCT Filed: Sep. 17, 2020

(86) PCT No.: PCT/JP2020/035247
§ 371 (c)(1),
(2) Date: May 6, 2022

(87) PCT Pub. No.: WO2021/095360
PCT Pub. Date: May 20, 2021

(65) Prior Publication Data
US 2022/0416229 A1      Dec. 29, 2022

(30) Foreign Application Priority Data
Nov. 14, 2019      (JP) ................................. 2019-206455

(51) Int. Cl.
*H01M 4/36* (2006.01)
*H01M 4/02* (2006.01)
*H01M 4/525* (2010.01)

(52) U.S. Cl.
CPC ........... *H01M 4/366* (2013.01); *H01M 4/525* (2013.01); *H01M 2004/028* (2013.01)

(58) Field of Classification Search
CPC ..................................................... H01M 4/366
See application file for complete search history.

(56) References Cited

U.S. PATENT DOCUMENTS

| | | | | |
|---|---|---|---|---|
| 2002/0055042 A1* | 5/2002 | Kweon | ................... | H01M 4/38 |
| | | | | 429/231.95 |
| 2003/0031930 A1 | 2/2003 | Hamano et al. | | |

(Continued)

FOREIGN PATENT DOCUMENTS

| | | |
|---|---|---|
| CN | 103367723 A | 10/2013 |
| CN | 108390039 A | 8/2018 |

(Continued)

OTHER PUBLICATIONS

Machine translation of JP 2005310744 (Year: 2005).*

(Continued)

*Primary Examiner* — Maria Laios
(74) *Attorney, Agent, or Firm* — WHDA, LLP

(57) ABSTRACT

This positive electrode active material used in a non-aqueous electrolyte secondary battery includes a lithium transition metal composite oxide containing Al and Ni in an amount of at least 80 mol % with respect to the total number of moles of metal elements excluding Li, wherein a primary particle of the lithium transition metal composite oxide has a surface modification layer containing at least Ca on the surface thereof.

7 Claims, 1 Drawing Sheet

(56) References Cited

U.S. PATENT DOCUMENTS

| | | | |
|---|---|---|---|
| 2008/0090150 | A1 | 4/2008 | Nakura |
| 2008/0248391 | A1 | 10/2008 | Wakasugi et al. |
| 2011/0020704 | A1 | 1/2011 | Fukuchi et al. |
| 2020/0395611 | A1 | 12/2020 | Aoki et al. |

FOREIGN PATENT DOCUMENTS

| | | | |
|---|---|---|---|
| CN | 108682842 | A | 10/2018 |
| CN | 108735993 | A | 11/2018 |
| CN | 109065868 | A | 12/2018 |
| JP | 2001-291518 | A | 10/2001 |
| JP | 2003-100295 | A | 4/2003 |
| JP | 2005-310744 | A | 11/2005 |
| JP | 2006-302880 | A | 11/2006 |
| JP | 2009-032467 | A | 2/2009 |
| JP | 2012-79703 | A | 4/2012 |
| JP | 2018-129221 | A | 8/2018 |
| WO | 2018/025795 | A1 | 2/2018 |
| WO | 2019/131234 | A1 | 7/2019 |

OTHER PUBLICATIONS

Office Action dated Mar. 30, 2023, issued in counterpart ID Application No. P00202205312, with English translation. (6 pages).
Office Action dated Aug. 13, 2024, issued in counterpart JP Application No. 2021-555925 with English translation. (19 pages).
International Search Report dated Nov. 17, 2020, issued in counterpart International Application No. PCT/ JP2020/035247 (2 pages).
Extended (Supplementary) Search Report dated Nov. 25, 2022, issued in counterpart EP Application No. 20886726.7. (8 pages).

* cited by examiner

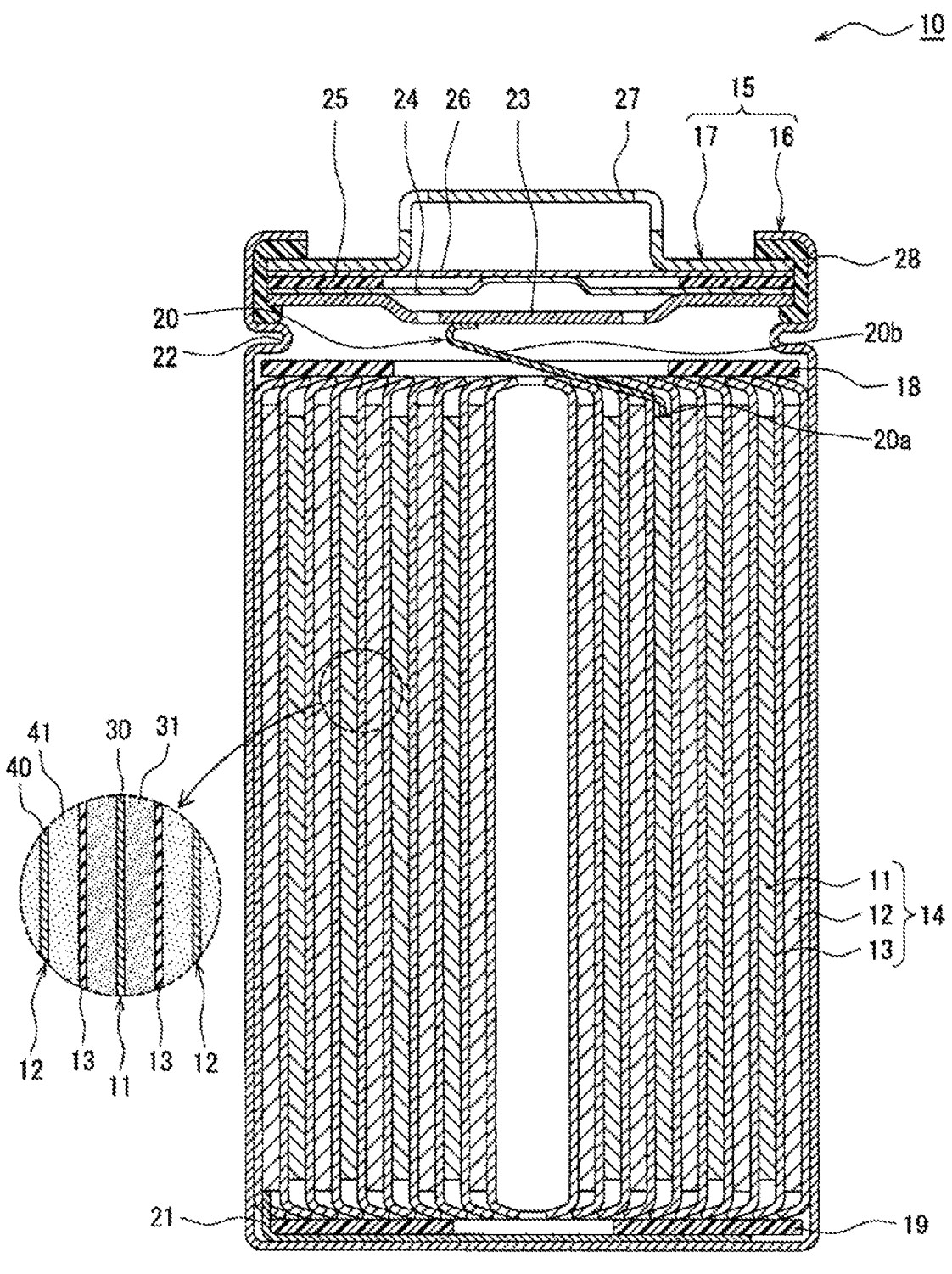

POSITIVE ELECTRODE ACTIVE MATERIAL FOR NON-AQUEOUS ELECTROLYTE SECONDARY BATTERY, AND NON-AQUEOUS ELECTROLYTE SECONDARY BATTERY

CROSS-REFERENCE TO RELATED APPLICATION

This application is a National Phase Application filed under 35 U.S.C. § 371 of International Application No. PCT/JP2020/035247 filed on Sep. 17, 2020 which claims the benefit of priorities under 35 U.S.C. § 119(a) of Japanese Patent Application No. 2019-206455 filed in Japan on Nov. 14, 2019, the contents of which are incorporated herein by reference.

TECHNICAL FIELD

The present disclosure relates to a positive electrode active material for non-aqueous electrolyte secondary batteries and a non-aqueous electrolyte secondary battery.

BACKGROUND ART

In recent years, lithium transition metal composite oxides with high Ni content have attracted attention as positive electrode active materials having a high energy density. Patent Literature 1 discloses, for example, a positive electrode active material for non-aqueous electrolyte secondary batteries that is composed of a lithium transition metal composite oxide represented by the formula: $Li_xNi_{1-y-z}Co_zM_mO_2$ where in the formula, M is an element selected from Ba, Sr, and B, and $0.9 \leq x \leq 1.1$, $0.5 \leq y \leq 0.95$, $0.05 \leq z \leq 0.5$, and $0.0005 \leq m \leq 0.02$, and has a BET specific surface area of 0.8 m²/g or smaller.

Moreover, Patent Literature 2 discloses a positive electrode active material for non-aqueous electrolyte secondary batteries, having an α-NaFeO₂ structure and including one or more selected from the group consisting of Mn, Ni, and Co as transition metal elements, wherein an alkaline earth metal and W are present on a particle surface of the lithium transition metal composite oxide.

CITATION LIST

Patent Literature

PATENT LITERATURE 1: Japanese Unexamined Patent Application Publication No. 2003-100295
PATENT LITERATURE 2: Japanese Unexamined Patent Application Publication No. 2018-129221

SUMMARY

When using a lithium transition metal composite oxide with high Ni content for a positive electrode active material of non-aqueous electrolyte secondary batteries, a larger amount of Li is extracted upon charge, therefore causing problems of deformation of the layered crystal structure and reduction in capacity when carrying out repeated charge/discharge. The technologies disclosed in Patent Literatures 1 and 2 still have room for improvement in charge/discharge cycle characteristics.

The positive electrode active material for non-aqueous electrolyte secondary batteries, which is one aspect of the present disclosure, includes a lithium transition metal composite oxide including at least 80 mol % or more of Ni relative to the total number of mole of metal elements excluding Li, and Al; and a surface modification layer formed on the surface of primary particles of the lithium transition metal composite oxide and including at least Ca.

The non-aqueous electrolyte secondary battery, which is one aspect of the present disclosure, comprises a positive electrode including the aforementioned positive electrode active material for non-aqueous electrolyte secondary batteries, a negative electrode, and a non-aqueous electrolyte.

The positive electrode active material for non-aqueous electrolyte secondary batteries, which is an aspect of the present disclosure, includes a lithium transition metal composite oxide with high Ni content and can contribute to improving charge/discharge cycle characteristics of a battery. According to the positive electrode active material for non-aqueous electrolyte secondary batteries that is one aspect of the present disclosure, it is possible to provide a non-aqueous electrolyte secondary battery of high capacity, capable of inhibiting a decrease in battery capacity accompanying charge/discharge.

BRIEF DESCRIPTION OF DRAWING

FIG. 1 is a cross sectional plan view of the non-aqueous electrolyte secondary battery according to an example of an embodiment.

DESCRIPTION OF EMBODIMENTS

In a layered structure of the lithium transition metal composite oxide included in the positive electrode active material, a transition metal layer such as Ni, a Li layer, and an oxygen layer are present, and the Li ions present in the Li layer reversibly move in and out, so that a charge/discharge reaction of the battery proceeds. When using the lithium transition metal composite oxide with high Ni content, many Li ions are extracted from the Li layer upon battery charge, whereby the layered structure may become unstable. On a surface of the lithium transition metal composite oxide in which the layered structure has become unstable, a deteriorated layer is formed by a reaction with an electrolyte. Since a structural change of the lithium transition metal composite oxide further proceeds at the deteriorated layer as a starting point, a battery capacity gradually decreases accompanying charge/discharge.

Therefore, the present inventors have found, as a result of diligent investigation for solving the above problems, that a positive electrode active material, which comprises a surface modification layer including Ca on the surface of lithium transition metal composite oxide including a predetermined amount of Al, inhibits reduction in a battery capacity accompanying charge/discharge because the synergistic effect of Al and Ca stabilizes the layered structure, while inhibiting a reaction with an electrolyte on the surface. Since Al does not change in oxidation number even during charge/discharge, Al incorporated in the transition metal layer is presumed to stabilize the structure of the transition metal layer. Moreover, Ca is assumed to inhibit electrolyte erosion of the surface modification layer by electronic interaction.

An example of the embodiment of the non-aqueous electrolyte secondary battery according to the present disclosure will be described in detail below. In the following, a cylindrical battery in which a wound electrode assembly is housed in a cylindrical battery case is illustrated, however, the electrode assembly is not limited to the wound type, and a plurality of positive electrodes and a plurality of negative electrodes may be alternately stacked one by one with separators interposed therebetween. Further, the battery case is not limited to a cylindrical shape, and may be, for example, a square shape, or a coin shape, or may be a battery case formed of a laminated sheet including a metal layer and a resin layer.

FIG. 1 is a cross sectional plan view of a non-aqueous electrolyte secondary battery 10 that is an example of the embodiment. As illustrated in FIG. 1, non-aqueous electrolyte secondary battery 10 comprises an electrode assembly 14, a non-aqueous electrolyte (not shown), and a battery case 15 that houses electrode assembly 14 and the non-aqueous electrolyte. Electrode assembly 14 has a wound structure in which a positive electrode 11 and a negative electrode 12 are wound via a separator 13. Battery case 15 is composed of a bottomed cylindrical outer can 16 and a sealing assembly 17 that clogs up the opening of an outer can 16.

Electrode assembly 14 is composed of long positive electrode 11, long negative electrode 12, two long separators 13, a positive electrode tab 20 joined to positive electrode 11, and a negative electrode tab 21 joined to negative electrode 12. Negative electrode 12 is formed to have a size one size larger than that of positive electrode 11 in order to prevent lithium from precipitation. Namely, negative electrode 12 is formed longer than positive electrode 11 in the longitudinal direction and the width direction (short direction). Two separators 13 are formed to have sizes at least one size larger than a size of positive electrode 11, and are arranged to sandwich positive electrode 11, for example.

Non-aqueous electrolyte secondary battery 10 comprises insulating plates 18 and 19 arranged above and below electrode assembly 14, respectively. In the example shown in FIG. 1, positive electrode tab 20 attached to positive electrode 11 extends to the sealing assembly 17 side through the throughhole of insulating plate 18, and negative electrode tab 21 attached to negative electrode 12 passes through the outside of insulating plate 19 and extends to the bottom side of outer can 16. Positive electrode tab 20 is connected to the lower surface of a bottom plate 23 of sealing assembly 17 by welding or the like, and a cap 27 of sealing assembly 17 electrically connected to bottom plate 23 serves as a positive electrode terminal. Negative electrode tab 21 is connected to the inner surface of the bottom of outer can 16 by welding or the like, and outer can 16 serves as a negative electrode terminal.

Outer can 16 is, for example, a bottomed cylindrical metal container. A gasket 28 is arranged between outer can 16 and sealing assembly 17, and seals the internal space of battery case 15. Outer can 16 has a grooved portion 22 that supports sealing assembly 17, which is formed by pressing, for example, the side surface portion from the outside. Grooved portion 22 is preferably formed in an annular shape along the circumferential direction of outer can 16, and supports sealing assembly 17 on the upper surface of the grooved portion.

Sealing assembly 17 has a structure in which bottom plate 23, a lower vent member 24, an insulating member 25, an upper vent member 26, and cap 27 are stacked in this order from the electrode assembly 14 side. Each member constituting sealing assembly 17 has, for example, a disk shape or a ring shape, and each member except insulating member 25 is electrically connected to each other. Lower vent member 24 and upper vent member 26 are connected to each other at the central portion thereof, and insulating member 25 is interposed between the peripheral portions of each member. When the internal pressure of the battery rises due to abnormal heat generation, lower vent member 24 is deformed and broken so as to push upper vent member 26 toward the cap 27 side, and the current path between lower vent member 24 and upper vent member 26 is cut off. When the internal pressure further rises, upper vent member 26 is broken and a gas is discharged from the opening of cap 27.

Hereinafter, positive electrode 11, negative electrode 12, separator 13, and the non-aqueous electrolyte, constituting non-aqueous electrolyte secondary battery 10, will be described in detail, and in particular, the positive electrode active material included in a positive electrode mixture layer 31 forming positive electrode 11 will be described in detail.

[Positive Electrode]

Positive electrode 11 has a positive electrode current collector 30 and a positive electrode mixture layer 31 formed on both sides of positive electrode current collector 30. As positive electrode current collector 30, a foil of a metal such as aluminum or an aluminum alloy that is stable in the potential range of positive electrode 11, or a film or the like in which the metal is arranged on the surface layer, can be used. Positive electrode mixture layer 31 includes a positive electrode active material, a conductive agent, and a binder. The thickness of positive electrode mixture layer 31 is, for example, 10 $\mu$m to 150 $\mu$m on one side of positive electrode current collector 30. Positive electrode 11 is fabricated by coating a surface of positive electrode current collector 30 with a positive electrode slurry including the positive electrode active material, the conductive agent, the binder, etc., drying the coating film, and then compressing it to form positive electrode mixture layers 31 on both sides of the positive electrode current collector 30.

The conductive agent included in positive electrode mixture layer 31 that is carbon materials such as carbon black, acetylene black, Ketjen black, and graphite, can be exemplified. As the binder included in positive electrode mixture layer 31, fluororesins such as polytetrafluoroethylene (PTFE) and polyvinylidene difluoride (PVdF), polyacrylonitrile (PAN), polyimides, acrylic resins, and polyolefins can be exemplified. These resins may be combined with carboxymethyl cellulose (CMC) or a salt thereof, polyethylene oxide (PEO), or the like.

The positive electrode active material includes the lithium transition metal composite oxide and the surface modification layer formed on the surface of primary particles of the lithium transition metal composite oxide and including at least Ca. The lithium transition metal composite oxide includes at least 80 mol % or more of Ni relative to the total number of mole of metal elements excluding Li, and Al. When the content of Ni is 80 mol % or more relative to the total number of mole of metal elements excluding Li in the lithium transition metal composite oxide, a battery of high capacity can be obtained.

The content of Ni is preferably 90 mol % or more relative to the total number of mole of metal elements excluding Li in the lithium transition metal composite oxide, from which a battery of higher capacity can be obtained. On the other hand, when the content of Ni exceeds 96 mol % relative to the total number of mole of metal elements excluding Li, the content of Al and Ca becomes so low that the stability of the layered structure and surface structure of the lithium transition metal composite oxide cannot be ensured.

The lithium transition metal composite oxide has a layered structure. The layered structure of the lithium transition metal composite oxide includes, for example, a layered structure belonging to a space group R-3m, and a layered structure belonging to a space group C2/m. Among them, the layered structure belonging to the space group R-3m is preferred in terms of increasing capacity, stability of crystal structure, etc.

The lithium transition metal composite oxide can be a composite oxide represented by the formula: $Li_aNi_xAl_y$-$Co_zM_wO_{2-b}$ wherein in the formula, $0.95 < a < 1.05$, $0.8 \leq x \leq 0.96$, $0 < y \leq 0.10$, $0 \leq z \leq 0.15$, $0 \leq w \leq 0.1$, $0 \leq b \leq 0.05$, $x+y+z+w=1$, and M is at least one element selected from Mn, Fe. Ti, Si, Nb, Zr, Mo and Zn. The positive electrode active material may include a lithium transition metal composite oxide other than that represented by the above formula, or another compound, as long as the object of the present disclosure is not impaired. Molar fractions of the metal elements included in the entire particle of the lithium transition metal composite oxide can be measured by an inductively coupled plasma atomic emission spectrometer (ICP-AES), an electron beam microanalyzer (EPMA), an energy dispersive X ray analyzer (EDX) or the like.

The subscript a denoting a proportion of Li in the lithium transition metal composite oxide preferably satisfies $0.95 \leq a < 1.05$ and more preferably $0.97 \leq a \leq 1.03$. When a is less than 0.95, the battery capacity may be decreased as compared with the case where a satisfies the above range. When a is 1.05 or more, a larger amount of Li compound is to be added as compared with the case where a satisfies the above range, which may not be economical from the viewpoint of production cost.

The subscript y denoting a content of Al to the total number of mole of metal elements excluding Li in the lithium transition metal composite oxide, preferably satisfies $0 < y \leq 0.10$ and more preferably $0.03 \leq y \leq 0.07$. Al that does not change in oxidation number even during charge/discharge and is included in the transition metal layer, is presumed to stabilize the structure of the transition metal layer. When $y > 0.10$, on the other hand, Al impurities are generated, lowering the battery capacity. For example, Al may be uniformly dispersed in the layered structure of the lithium transition metal composite oxide, or may be present in a portion of the layered structure.

Co and M (M is at least one element selected from Mn, Fe, Ti, Si, Nb, Zr, Mo and Zn) are optional components. The subscript z and w denoting the contents of Co and M to the total number of mole of metal elements excluding Li in the lithium transition metal composite oxide preferably satisfy $0 \leq z \leq 0.15$ and $0 \leq w \leq 0.1$, respectively. Co is expensive and therefore a Co content is preferably minimized from the viewpoint of production cost.

The lithium transition metal composite oxide is, for example, a secondary particle formed by aggregating a plurality of primary particles. The particle size of the primary particle constituting the secondary particle is, for example, 0.05 μm to 1 μm. The particle size of the primary particle is measured as a diameter of a circumscribed circle in the particle image observed by a scanning electron microscope (SEM). The surface modification layer is present on the surface of the primary particles. In other words, the surface modification layer is present on the surface of the secondary particles of the lithium transition metal composite oxide or at the interface where the primary particles contact with each other.

The lithium transition metal composite oxide is a particle having a volume-based median diameter (D50) of, for example, 3 μm to 30 μm, preferably 5 μm to 25 μm, and particularly preferably 7 μm to 15 μm. D50 refers to a particle size in which a cumulative frequency is 50% from the smallest particle size in a volume-based particle size distribution, and is also called a median diameter. The particle size distribution of the lithium transition metal composite oxide can be measured by using a laser diffraction type particle size distribution measuring apparatus (for example, MT3000II manufactured by MicrotracBEL Corp.) and water as a dispersion medium.

The lithium transition metal composite oxide has a surface layer present on an inner side from the surface and a main body portion present on an inner side of the surface layer. The thickness of the surface layer is, for example, 1 nm to 5 nm.

A thickness of the surface modification layer is, for example, 0.1 nm to 5 nm. The thickness within this range inhibits a reaction with the electrolyte on the surface of the lithium transition metal composite oxide, which enables to inhibit reduction in battery capacity accompanying charge/discharge.

The surface modification layer includes at least Ca. The surface modification layer may include, for example, Ca or a compound including Ca. As the compound including Ca, CaO, $Ca(OH)_2$ and $CaCO_3$ can be exemplified.

The content of Ca in the total number of mole of metal elements excluding Li in the surface modification layer can be 1.5 mol % to 20 mol %, as analyzed compositionally with energy dispersive X-ray spectroscopy (TEM-EDX). The content within this range can further improve the charge/discharge cycle characteristics of the battery by the synergistic effect with Al. Here, the composition of the surface modification layer as well as the compositions of the main body portion and the surface layer of the lithium transition metal composite oxide in the positive electrode active material can be measured as contents of Ni, Co, Al, M and Ca by analyzing each location in the cross section of the primary particle of the positive electrode active material with TEM-EDX. Since the surface modification layer is thinner than the spot diameter of an irradiated electron beam, the composition of the surface layer is influenced by the composition of the adjacent surface modification layer, and therefore even though a trace amount of Ca is detected from the measurement results of the surface layer. Ca is presumed not to be actually present in the surface layer.

Further, no peak derived from CaO is preferably present in the X-ray diffraction pattern obtained by X-ray diffraction measurement of the lithium transition metal composite oxide. The CaO included to the extent that it is detected in the X-ray diffraction measurement may cause reduction in a charge/discharge capacity, etc. Here, the X-ray diffraction pattern is obtained by using, for example, a powder X-ray diffractometer (product name "RINT-TTR", source: Cu-Kα, manufactured by Rigaku Corporation), according to a powder X-ray diffraction method under the following conditions.

Measurement range: 15 to 120°
Scanning speed: 4°/min
Analysis range: 30 to 120°
Background: B-spline
Profile function: Split pseudo-Voigt function
Binding condition: Li(3a)+Ni(3a)=1
Ni(3a)+Ni(3b)=y (y is a proportion of Ni content in each)
ICSD No.: 98-009-4814

The surface modification layer may further include Al. In other words, the surface modification layer may further include Al or a compound including Al, as well as at least one or more selected from compounds containing Ca and Al. As the compound including Al, $Al_2O_3$ can be exemplified. Moreover, as compounds including Ca and Al, $CaAl_2O_4$ and $Ca_3Al_2O_6$ can be exemplified. The surface modification layer may further include Li.

A molar ratio of Al to Ni in the surface modification layer may be more than a molar ratio of Al to Ni in the main body portion, as analyzed compositionally by energy dispersive X-ray spectroscopy (TEM-EDX). This can further improve the charge/discharge cycle characteristics of the battery by the synergistic effect with Ca.

Further, the molar ratio of Al to Ni in the surface modification layer is preferably twice the molar ratio of Al to Ni in the main body portion, as analyzed compositionally by energy dispersive X-ray spectroscopy (TEM-EDX). The molar ratio within this range allows the charge/discharge cycle characteristics of the battery to be improved more significantly.

Next, an example of a method for producing the positive electrode active material including the lithium transition metal composite oxide and the surface modification layer will be described.

The method for producing a positive electrode active material comprises, for example, a first step of obtaining a composite oxide including Ni, Al and an arbitrary metal element, a second step of mixing the composite oxide obtained in the first step and a lithium compound to obtain a mixture, and a third step of calcinating the mixture. Each parameter of the compositions and thicknesses of the surface layer and the surface modification layer in the finally obtained positive electrode active material is adjusted by controlling, for example, the mixing proportion of the raw materials in the second step, and the calcination temperature and time in the third step.

In the first step, for example, while stirring a solution of metal salts including Ni. Al and an arbitrary metal element (Co. Mn, Fe or the like), an alkaline solution such as sodium hydroxide is added dropwise, and the pH is adjusted to the alkaline side (for example, 8.5 to 12.5) to precipitate (co-precipitate) a composite hydroxide including Ni, Al and the arbitrary metal element, and then the composite hydroxide is calcinated to obtain a composite oxide including Ni, Al and the arbitrary metal element. The calcination temperature is not particularly limited, but is, for example, in the range of $300°$ C. to $600°$ C.

In the second step, the composite oxide obtained in the first step is mixed with a lithium compound and a calcium compound to obtain a mixture. The lithium compound includes, for example, $Li_2CO_3$, $LiOH$, $Li_2O_2$, $Li_2O$, $LiNO_3$, $LiNO_2$, $Li_2SO_4$, $LiOH—H_2O$, $LiH$ and $LiF$. The calcium compound includes $Ca(OH)_2$, $CaO$, $CaCO_3$, $CaSO_4$ and $Ca(NO_3)_2$. The mixing proportion of the composite oxide obtained in the first step and the lithium compound is, preferably, for example, such that the molar ratio of the metal elements excluding Li and Li is in the range of 1:0.98 to 1:1.1, in terms of facilitating the aforementioned each parameter to be adjusted to the aforementioned specified ranges. Further, a mixing proportion of the composite oxide obtained in the first step and the calcium compound is preferably, for example, such that the molar ratio of the metal elements excluding Li to Ca is in the range of 1:0.0005 to 1:0.02, in terms of facilitating the aforementioned each parameter to be adjusted to the aforementioned specified range. In the second step, when mixing the composite oxide obtained in the first step, the lithium compound, and the calcium compound, some other metal raw material may be added if necessary. The other metal raw material is an oxide or the like including a metal element other than the metal elements constituting the composite oxide obtained in the first step. In the third step, the mixture obtained in the second step is calcinated at a predetermined temperature and time to obtain a positive electrode active material according to the present embodiment. The calcination of the mixture in the third step comprise a multi-step calcination step including, for example, a first calcination step of calcinating in a calcination furnace at a first rate of temperature rise up to a first set temperature of $450°$ C. to $680°$ C. under an oxygen stream, and a second calcination step of calcinating the calcinated product obtained in the first calcination step in a calcination furnace at a second rate of temperature rise up to a second set temperature of higher than $680°$ C. and $800°$ C. or lower under an oxygen stream. Here, the first rate of temperature rise is in the range of $1.5°$ C./min to $5.5°$ C./min, and the second rate of temperature rise that is slower than the first rate of temperature rise is $0.1°$ C./min to $3.5°$ C./min. For the positive electrode active material of the present embodiment finally obtained, such multi-step calcination can adjust each parameter of the compositions and thicknesses of the surface layer and the surface modification layer, and the like, within the specified range described above. A plurality of the first rates of temperature rise and the second rates of temperature rise may be set for each temperature region provided that they are within the aforementioned specified ranges, respectively. The holding time of the first set temperature in the first calcination step is preferably 5 hours or shorter, and more preferably 3 hours or shorter in terms of adjusting each of the above parameters of the lithium transition metal composite oxide to the aforementioned specified ranges. The holding time of the first set temperature is the time for maintaining the first set temperature after reaching the first set temperature. The holding time of the second set temperature in the second calcination step is preferably 1 hour to 10 hours and more preferably 1 hour to 5 hours, in terms of adjusting each of the above parameters of the lithium transition metal composite oxide to the aforementioned specified ranges. The holding time of the second set temperature is the time for maintaining the second set temperature after reaching the second set temperature. When calcinating the mixture, in order to adjust each of the above parameters to the aforementioned specified ranges, for example, calcination can be carried out in an oxygen stream having an oxygen concentration of 60% or more and a flow rate of the oxygen stream being set to in the range of 0.2 mL/min to 4 mL/min per 10 cm$^3$ of the calcination furnace and 0.3 L/min or more per kg of the mixture.

Molar fractions of the metal elements included in the positive electrode active material obtained above were measured by inductively coupled plasma (ICP) emission spectroscopic analysis and the positive electrode active material can be represented by the formula: $Li_aNi_xAl_yCo_zM_wCa_\alpha O_{2-b}$ wherein in the formula, $0.95<a<1.05$, $0.8\leq x\leq0.96$, $0\leq y\leq0.10$, $0\leq z\leq0.15$, $0\leq w\leq0.1$, $0.0005\leq a\leq0.02$, $0\leq b<0.05$, $x+y+z+w=1$, and M is at least one element selected from Mn, Fe, Ti, Si, Nb, Zr, Mo and Zn. It should be noted that Ca is not dissolved in the lithium transition metal composite oxide, but is included in the surface modification layer present on the surface of the lithium transition metal composite oxide. Moreover, a portion of Al may be included in the surface modification layer.

Negative Electrode

Negative electrode 12 has a negative electrode current collector 40 and negative electrode mixture layers 41 formed on both sides of negative electrode current collector 40. As negative electrode current collector 40, a foil of a metal such as copper or a copper alloy that is stable in the potential range of negative electrode 12, or a film or the like in which the metal is arranged on the surface layer, can be used. Negative electrode mixture layer 41 includes a negative electrode active material and a binder. The thickness of negative electrode mixture layer 41 is, for example, 10 μm to 150 μm on one side of negative electrode current collector 40. Negative electrode 12 can be fabricated by coating the surface of negative electrode current collector 40 with a negative electrode mixture slurry including the negative electrode active material, the binder, etc., drying the coating film, and then rolling it to form negative electrode mixture layers 41 on both sides of negative electrode current collector 40.

The negative electrode active material included in negative electrode mixture layer 41 is not particularly limited provided that it can reversibly intercalate and deintercalate lithium ions, and a carbon material such as graphite is generally used. The graphite may be any of natural graphite such as scaly graphite, massive graphite and earthy graphite, and artificial graphite such as massive artificial graphite and graphitized mesophase carbon microbeads. Moreover, as the negative electrode active material, a metal such as Si or Sn that alloys with Li, a metal compound including Si, Sn or the like, a lithium titanium composite oxide, or the like may be used. Further, such a material coated with a carbon film may be used. For example, a Si-containing compound represented by $SiO_x$ ($0.5 \leq x \leq 1.6$), a Si-containing compound in which Si fine particles are dispersed in a lithium silicate phase represented by $L_{2y}SiO_{(2+y)}$ ($0 < y < 2$), or the like can be combined with graphite.

As the binder included in negative electrode mixture layer 41, a fluororesin such as PTFE or PVdF, a PAN, a polyimide, an acrylic resin, a polyolefin or the like may be used as in the case of positive electrode 11, however, styrene-butadiene rubber (SBR) is preferably used. Moreover, negative electrode mixture layer 41 may include CMC or a salt thereof, polyacrylic acid (PAA) or a salt thereof, polyvinyl alcohol (PVA), etc.

[Separator]

Separator 13 that is, for example, a porous sheet having ion permeability and insulating property, is used. Specific examples of the porous sheet include a microporous thin membrane, a woven fabric, and a non-woven fabric. As a material of the separator 13, a polyolefin such as polyethylene or polypropylene, cellulose, or the like is suitable. Separator 13 may have a single-layer structure or a multilayer structure. Further, a resin layer having high heat resistance, such as an aramid resin, and a filler layer including a filler of an inorganic compound, may be disposed on a surface of separator 13.

Non-Aqueous Electrolyte

The non-aqueous electrolyte includes, for example, a non-aqueous solvent and an electrolyte salt dissolved in the non-aqueous solvent. As the non-aqueous solvent, for example, an ester, an ether, a nitrile such as acetonitrile, an amide such as dimethylformamide, or a mixed solvent of two or more of them can be used. The non-aqueous solvent may include a halogen substituent in which at least a portion of hydrogen in the solvent is substituted with a halogen atom such as fluorine. The halogen substituent includes, for example, a fluorinated cyclic carbonate such as fluoroethylene carbonate (FEC), a fluorinated chain carbonate, and a fluorinated chain carboxylic acid ester such as fluorine methyl propionate (FMP).

Examples of the aforementioned esters include cyclic carbonate esters such as ethylene carbonate (EC), propylene carbonate (PC) and butylene carbonate, chain carbonate esters such as dimethyl carbonate (DMC), ethyl methyl carbonate (EMC), diethyl carbonate (DEC), methylpropyl carbonate, ethylpropyl carbonate, and methylisopropylcarbonate, cyclic carboxylic acid esters such as γ-butyrolactone (GBL) and γ-valerolactone (GVL), and chain carboxylic acid esters such as methyl acetate, ethyl acetate, propyl acetate, methyl propionate (MP) and ethyl propionate (EP).

Examples of the aforementioned ethers include cyclic ethers such as 1,3-dioxolane, 4-methyl-1,3-dioxolane, tetrahydrofuran, 2-methyltetrahydrofuran, propylene oxide, 1,2-butylene oxide, 1,3-dioxane, 1,4-dioxane, 1,3,5-trioxane, furan, 2-methylfuran, 1,8-cineole, crown ether, and chain ethers such as 1,2-dimethoxyethane, diethyl ether, dipropyl ether, diisopropyl ether, dibutyl ether, dihexyl ether, ethyl vinyl ether, butyl vinyl ether, methyl phenyl ether, ethyl phenyl ether, butyl phenyl ether, pentyl phenyl ether, methoxy toluene, benzyl ethyl ether, diphenyl ether, dibenzyl ether, o-dimethoxybenzene, 1,2-diethoxyethane, 1,2-dibutoxyethane, diethylene glycol dimethyl ether, diethylene glycol diethyl ether, diethylene glycol dibutyl ether, 1,1-dimethoxymethane, 1,1-diethoxyethane, triethylene glycol dimethyl ether and tetraethylene glycol dimethyl ether.

The electrolyte salt is preferably a lithium salt. Examples of lithium salts include borates such as $LiBF_4$, $LiClO_4$, $LiPF_6$, $LiAsF_6$, $LiSbF_6$, $LiAlCl_4$, $LiSCN$, $LiCF_3SO_3$, $LiCF_3CO_2$, $Li(P(C_2O_4)F_4)$, $LiPF_{6-x}(C_nF_{2n+1})_x$ ($1 < x < 6$, n is 1 or 2), $LiB_{10}Cl_{10}$, $LiCl$ $LiBr$, $LiI$, lithium chloroborane, lithium lower aliphatic carboxylate, $Li_2B_4O_7$, $Li(B)(C_2O_4)$ $F_2)$, and imide salts such as $LiN(SO_2CF_3)_2$ and $LiN(C_1F_{2l+1}$ $SO_2)$ $(C_mF_{2m+1}SO_2)$ wherein l and m are integers of 0 or more. The lithium salt may be used alone, or a plurality of types may be mixed and used. Among them, $LiPF_6$ is preferably used from the viewpoint of ionic conductivity, electrochemical stability, etc. The concentration of the lithium salt is, for example, 0.8 mol to 1.8 mol per 1 L of the non-aqueous solvent. Moreover, a vinylene carbonate or a propane sultone-based additive may be further added.

EXAMPLES

The present disclosure will be further described below with reference to Examples and Comparative Examples, but the present disclosure is not limited to the following Examples.

Production of Positive Electrode Active Material

Example 1

A metal composite oxide represented by the formula $Ni_{0.90}Co_{0.05}Al_{0.05}O_2$ was mixed with calcium hydroxide $(Ca(OH)_2)$ so that the content of Ca was 0.1 mol % relative to the total amount of Ni, Co. and Al of the metal composite oxide, and further mixed with lithium hydroxide monohydrate $(LiOH.H_2O)$ so that the molar ratio of the total of Ni, Co. Al and Ca to Li was 1:1.02. After the mixture was calcined from room temperature to 650° C. under an oxygen stream with an oxygen concentration of 95% (flow rate of 10 L/min per 1 kg of the mixture) at a rate of temperature rise of 2° C./min, it was calcined by raising the temperature from 650° C. to 720° C. at a rate of temperature rise of 1° C./min. Impurities were removed from this calcined product by washing with water to obtain the positive electrode active material of Example 1. As a result of analyzing the composition of positive electrode active material of Example 1 by using ICP-AES, the composition was found to be $Li_{0.99}Ni_{0.899}Co_{0.05}Al_{0.05}Ca_{0.001}O_2$.

Example 2

The positive electrode active material of Example 2 was obtained in the same manner as in Example 1 except that a metal composite oxide and calcium hydroxide $(Ca(OH)_2)$ were mixed so that the content of Ca was 0.15 mol % carried out at two different points of the first observation point and the second observation point, respectively. The results are shown in Table 1. The molar percentages of Ni, Co, and Al in Table 1 are expressed with the total amount of Ni, Co and Al being 100. X-ray diffraction measurement was carried out for Examples 1 and 2, and Comparative Example, and demonstrated that no peak derived from CaO was present in the X-ray diffraction patterns for all of them.

TABLE 1

| | | | | Composition of lithium transition metal composite oxide | | | | |
|---|---|---|---|---|---|---|---|---|
| | Amount of Ca added (mol %) | Measurement position | Analysis region | Ni (mol %) | Co (mol %) | Al (mol %) | Ca/ (Ni + Co + Al) | Al/Ni of surface modification layer/Al/Ni of main body portion |
| Example 1 | 0.1 | First measurement point | Surface modification layer | 82.8 | 3.9 | 13.3 | 3.1 | 4.6 |
| | | | Surface layer | 90.0 | 5.4 | 4.6 | Not detected | |
| | | | Main body portion | 91.7 | 5.1 | 3.2 | Not detected | |
| | | Second measurement point | Surface modification layer | 87.9 | 4.5 | 7.6 | 4.2 | 3.2 |
| | | | Surface layer | 89.5 | 5.5 | 5.0 | 0.5 | |
| | | | Main body portion | 91.3 | 6.2 | 2.5 | Not detected | |
| Example 2 | 0.15 | First measurement point | Surface modification layer | 85.0 | 4.6 | 10.4 | 4.0 | 3.5 |
| | | | Surface layer | 87.7 | 4.3 | 8.0 | 0.6 | |
| | | | Main body portion | 91.1 | 5.7 | 3.2 | Not detected | |
| | | Second measurement point | Surface modification layer | 87.0 | 4.1 | 8.9 | 6.5 | 2.9 |
| | | | Surface layer | 90.4 | 5.1 | 4.5 | 0.6 | |
| | | | Main body portion | 90.9 | 5.9 | 3.2 | Not detected | |
| Comparative Example | — | First measurement point | Surface modification layer | 84.1 | 12.4 | 3.5 | Not detected | 1.0 |
| | | | Surface layer | 88.6 | 7.0 | 4.4 | Not detected | |
| | | | Main body portion | 89.6 | 6.5 | 3.9 | Not detected | | relative to the total amount of Ni, Co, and Al of the metal composite oxide represented by the formula $Ni_{0.90}Co_{0.05}Al_{0.05}O_2$. The composition of the obtained positive electrode active material of Example 2 was $Li_{0.90}Ni_{0.899}Co_{0.05}Al_{0.05}Ca_{0.0015}O_2$.

Comparative Example

A positive electrode active material was obtained in the same manner as in Example 1 except that calcium hydroxide $(Ca(OH)_2)$ was not mixed, and after the mixture was calcinated from room temperature to 650° C. at a rate of temperature rise of 3.0° C./min, it was calcinated from 650° C. to 720° C. at a rate of temperature rise of 1° C./min. The composition of the obtained positive electrode active material was $Li_{0.99}Ni_{0.90}Co_{0.05}Al_{0.05}O_2$. This was used as a positive electrode active material of Comparative Example. It is noted that 0.01 mol % of Ca was detected from Comparative Example. Such an amount of Ca is very small compared to Ca included in Examples 1 and 2, and therefore is presumed not to influence on the experimental results.

TEM-EDX measurement was carried out for each of the positive electrode active materials of Examples 1 and 2 and Comparative Example, and composition analysis was carried out for each of the main body portion and the surface layer as well as the surface modification layer of the lithium transition metal composite oxide. The main body portion was measured at a distance of 15 nm or deeper from the surface of the lithium transition metal composite oxide to the inner side. For Examples 1 and 2, the measurements were A small amount of Ca was detected at the surface layers of the second measurement point in Example 1, the first measurement point and the second measurement point in Example 2, however, Ca is presumed not to be actually present in the surface layers as described above. The electron energy loss spectroscopy (TEM-EELS) measurement that was separately carried out also confirmed the presence of Ca only in the surface modification layer. In other words, in Examples 1 and 2, Ca was present only in the surface modification layer. On the other hand, no Ca was detected in any of the locations in Comparative Example where no Ca was added. Moreover, in Examples 1 and 2, Al was included in the surface modification layer, the surface layer, and the main body portion, in order of increasing Al. On the other hand, in Comparative Example, the content of Al was substantially the same in all the locations.

Next, by using the positive electrode active materials of Examples 1 and 2 and Comparative Example, test cells were fabricated as follows.

Fabrication of Positive Electrode 95 parts by mass of the positive electrode active material of each of Examples 1 and 2 and Comparative Example, 3 parts by mass of acetylene black as a conductive agent, and 2 parts by mass of polyvinylidene fluoride as a binder were mixed to prepare a positive electrode slurry by mixing with N-methyl-2-pyrrolidone (NMP). Next, a positive electrode current collector made of aluminum foil having a thickness of 15 pin was coated with the slurry and the coating film was dried, then rolled by a rolling roller, and cut into a predetermined electrode size to obtain a positive electrode in which positive electrode mixture layers were formed on both sides of the positive electrode core. It is noted that an exposed portion of the positive electrode core with the surface exposed was arranged on a portion of the positive electrode. Positive electrodes of other Examples and Comparative Example were fabricated in the same manner.

Fabrication of Negative Electrode

Natural graphite was used as a negative electrode active material. A negative electrode active material, sodium carboxymethyl cellulose (CMC-Na), and styrene-butadiene rubber (SBR) were mixed in an aqueous solution at a solid content mass ratio of 100:1:1 to prepare a negative electrode mixture slurry. Both sides of the negative electrode core made of copper foil were coated with the negative electrode mixture slurry, and the coating film was dried, rolled using a rolling roller, and cut to a predetermined electrode size to obtain a negative electrode in which negative electrode mixture layers were formed on both sides of the negative electrode core. It is noted that an exposed portion of the negative electrode core with the surface exposed was arranged in a portion of the negative electrode.

Preparation of Non-Aqueous Electrolyte

Ethylene carbonate (EC), methyl ethyl carbonate (MEC), and dimethyl carbonate (DMC) were mixed in a volume ratio of 3:3:4. A non-aqueous electrolyte was prepared by dissolving lithium hexafluorophosphate ($LiPF_6$) in the mixed solvent at a concentration of 1.2 mol/liter.

Fabrication of Test Cell

An aluminum lead was attached to the exposed portion of the positive electrode including the positive electrode active material of each of Examples 1 and 2, and Comparative Example, and a nickel lead was attached to the exposed portion of the aforementioned negative electrode, and the positive electrode and the negative electrode were spirally wound with a polyolefin separator interposed therebetween followed by press-formed in the radial direction to fabricate a flattened and wound electrode assembly. This electrode assembly was housed in an outer body, the aforementioned non-aqueous electrolyte was injected, and then an opening of the outer body was sealed to obtain a test cell.

Evaluation of Capacity Retention

The following cycle test was carried out for the battery fabricated by incorporating the positive electrode including the positive electrode active material of each of Examples 1 and 2 and Comparative Example. A discharge capacity of the first cycle of the cycle test and a discharge capacity of the 30th cycle were obtained to calculate the capacity retention by the following formula.

Capacity retention (%)=(30th cycle discharge capacity÷1st cycle discharge capacity)×100

Cycle Test

The test cell was charged at a constant current of 0.2 It under a temperature environment of 25° C. until the battery voltage reached 4.2 V, and then charged at a constant voltage of 4.2 V until the current value reached 1/100 It. Subsequently, constant current discharge was carried out with a constant current of 0.2 It until the battery voltage fell down to 2.5 V. This charge/discharge cycle was repeated 30 cycles.

Table 2 show the capacity retentions of Examples 1 and 2 and Comparative Example. The capacity retention of the test cell of Examples 1 and 2 shown in Table 2 is relatively expressed with the capacity retention of the test cell of Comparative Example 1 being 100%.

TABLE 2

| | Ratio of capacity retention (%) |
|---|---|
| Example 1 | 106 |
| Example 2 | 106 |
| Comparative Example | 100 |

As shown in Table 2, Examples 1 and 2 in which the positive electrode active materials including Ca in the surface modification layer were used, exhibited higher capacity retentions than Comparative Example in which the positive electrode active material including no Ca in the surface modification layer was used.

REFERENCE SIGNS LIST

10 non-aqueous electrolyte secondary battery
11 positive electrode
12 negative electrode
13 separator
14 electrode assembly
15 battery case
16 outer can
17 sealing assembly
18, 19 insulating plates
20 positive electrode tab
21 negative electrode tab
22 grooved portion
23 bottom plate
24 lower vent member
25 insulating member
26 upper vent member
27 cap
28 gasket
30 positive electrode current collector
31 positive electrode mixture layer
40 negative electrode current collector
41 negative electrode mixture layer

The invention claimed is:

1. A positive electrode active material for non-aqueous electrolyte secondary batteries, including:
   a lithium transition metal composite oxide including at least 80 mol % or more of Ni to a total number of mole of metal elements excluding Li, and Al; and
   a surface modification layer formed on a surface of a primary particle of the lithium transition metal composite oxide and including at least Ca and Al, wherein:
   a thickness of the surface modification layer is 0.1 nm to 5 nm,
   a content of Ca in a total number of mole of metal elements excluding Li in the surface modification layer is 3.1 mol % to 6.5 mol %, as analyzed compositionally by energy dispersive X-ray spectroscopy (TEM-EDX), and
   a content of Al in a total number of mole of metal elements excluding Li and Ca in the surface modification layer is 7.6 mol % to 13.3 mol %, as analyzed compositionally by energy dispersive X-ray spectroscopy (TEM-EDX).

2. The positive electrode active material for non-aqueous electrolyte secondary batteries according to claim 1, wherein the lithium transition metal composite oxide is represented by a formula: $Li_aNi_xAl_yCO_zM_wO_{2-b}$ wherein in the formula, $0.95<a<1.05$, $0.8≤x≤0.96$, $0<y≤0.10$, $0≤z≤0.15$, $0≤w≤0.1$, $0≤b<0.05$, $x+y+z+w=1$, and M is at least one element selected from Mn, Fe, Ti, Si, Nb, Zr, Mo and Zn.

3. The positive electrode active material for non-aqueous electrolyte secondary batteries according to claim 1, wherein
the lithium transition metal composite oxide has a surface layer present on an inner side from a surface and a main body portion present on an inner side of the surface layer; and
a molar ratio of Al to Ni in the surface modification layer is more than a molar ratio of Al to Ni in the main body portion, as analyzed compositionally by energy dispersive X-ray spectroscopy (TEM-EDX).

4. The positive electrode active material for non-aqueous electrolyte secondary batteries according to claim 3, wherein a molar ratio of Al to Ni in the surface modification layer is twice a molar ratio of Al to Ni in the main body portion, as analyzed compositionally by energy dispersive X-ray spectroscopy (TEM-EDX).

5. The positive electrode active material for non-aqueous electrolyte secondary batteries according to claim 1, wherein a content of Ni to a total number of mole of metal elements excluding Li in the lithium transition metal composite oxide is 90 mol % or more.

6. The positive electrode active material for non-aqueous electrolyte secondary batteries according to claim 1, wherein no peak derived from CaO is present in an X-ray diffraction pattern obtained by X-ray diffraction measurement of the lithium transition metal composite oxide including the surface modification layer.

7. A non-aqueous electrolyte secondary battery, comprising:
a positive electrode including the positive electrode active material for non-aqueous electrolyte secondary batteries according to claim 1;
a negative electrode; and
a non-aqueous electrolyte.

* * * * *